US008588778B2

(12) United States Patent
Majmundar et al.

(10) Patent No.: US 8,588,778 B2
(45) Date of Patent: *Nov. 19, 2013

(54) SYSTEM AND METHOD FOR FEMTOCELL RESELECTION

(75) Inventors: Milap Majmundar, Austin, TX (US); Randolph Wohlert, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 952 days.

This patent is subject to a terminal disclaimer.

(21) Appl. No.: 12/338,834

(22) Filed: Dec. 18, 2008

(65) Prior Publication Data
US 2010/0159917 A1 Jun. 24, 2010

(51) Int. Cl.
*H04W 36/00* (2009.01)

(52) U.S. Cl.
USPC ..... 455/436; 455/423; 455/435.1; 455/422.1; 455/69; 455/437; 370/329; 370/338; 370/395.2

(58) Field of Classification Search
USPC ............. 455/423, 435.1, 436, 422.1, 69, 437; 370/395.2, 329, 338
See application file for complete search history.

(56) References Cited

U.S. PATENT DOCUMENTS

| 2002/0159409 A1* | 10/2002 | Wolfe et al. | 370/329 |
|---|---|---|---|
| 2005/0096051 A1* | 5/2005 | Lee et al. | 455/438 |
| 2009/0196266 A1* | 8/2009 | Wu et al. | 370/338 |
| 2009/0213825 A1* | 8/2009 | Gupta et al. | 370/338 |
| 2009/0252099 A1* | 10/2009 | Black et al. | 370/329 |
| 2010/0113027 A1* | 5/2010 | Hsu | 455/436 |
| 2010/0113032 A1* | 5/2010 | Lee et al. | 455/437 |
| 2010/0124179 A1* | 5/2010 | Lee et al. | 370/252 |

* cited by examiner

Primary Examiner — Nimesh Patel
(74) Attorney, Agent, or Firm — Turocy & Watson, LLP

(57) ABSTRACT

A system and method for detecting the failure of a user's femto cell and automatically reselecting a neighboring femto cell to establish temporary communications until the user's femto cell returns to operation. The neighboring femto cell selected for use is based on signal strength and configuration parameters related to limitations placed on the temporary access by the neighboring femto cell owner. Once the user's femto cell returns to operation, the user's mobile communication device returns to use of the primary femto cell.

21 Claims, 9 Drawing Sheets

SYSTEM AND METHOD FOR FEMTOCELL RESELECTION

TECHNICAL FIELD

The subject innovation relates generally to wireless communications, and more specifically, to automatically selecting a secondary femto cell for communication after the failure of the primary femto cell.

BACKGROUND

The use of wireless communications devices have become so prevalent in today's society that almost everyone you see is talking on a cell phone or other wireless communication device. As people become more confident with the use of these wireless communication devices and the services they provide, the use of wired devices, such as a wired telephone at home, have become less important in day-to-day life. The result of this change in behavior has led many people to discontinue their wired communication service and rely entirely on their wireless communication device. In some circumstances, such as those living on the fringe of service or living in large multi-unit complexes, the marginal signal strength in these locations makes relying entirely on a wireless service a somewhat risky proposition.

Recognizing this shortcoming, femto cells evolved to allow the user to increase or provide sufficient signal strength in any area where the user desired wireless communication device usage and a high-speed internet connection was available. For example, a wireless communication device user can install and initialize a femto cell in their apartment and create a wireless communication service bubble permitting reliable communications by the wireless device and allowing the user to cancel their wired communications service and rely on their wireless communication device.

In time, another problem developed related to the use of femto cells for creating reliable wireless communications. If the femto cell experienced a failure, for example a component failure or an accident breaking the femto cell and disabling communications, a user relying solely on wireless communications was placed in a position of having no ability to communicate from the area previously serviced by the femto cell. Until the user obtained a replacement femto cell, they were without communications even though there were other femto cells within communication range capable of providing temporary communication service to the incapacitated mobile communication device. Accordingly, market pressure is demanding a system and method of providing temporary communications services to localized mobile communication device users from neighboring femto cells when the user's primary femto cell fails.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description presented later.

The disclosure describes a system and methods for providing the user one or more neighboring femto cells acting as a backup for the user's primary femto cell. The system and methods identify neighboring femto cells are identified by different mechanisms including but not limited to radio signal detection, location information known in the core network or femto cell gateway, GPS information and user provided information. Once identified, the user's identity is provisioned into acceptable neighboring femto cells.

Subsequently, if the user's femto cell fails, a neighboring femto cell adds the user's identity to the neighboring femto cell's access list and allows the user temporary access to the neighboring femto cell. The user's communication device will select a preferred femto cell for access based on parameters such as signal strength of the neighboring femto cells at the user's device. Once the user fixes or replaces their femto cell, a reselection is performed again and the user is removed from the access list of the neighboring femto cell.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
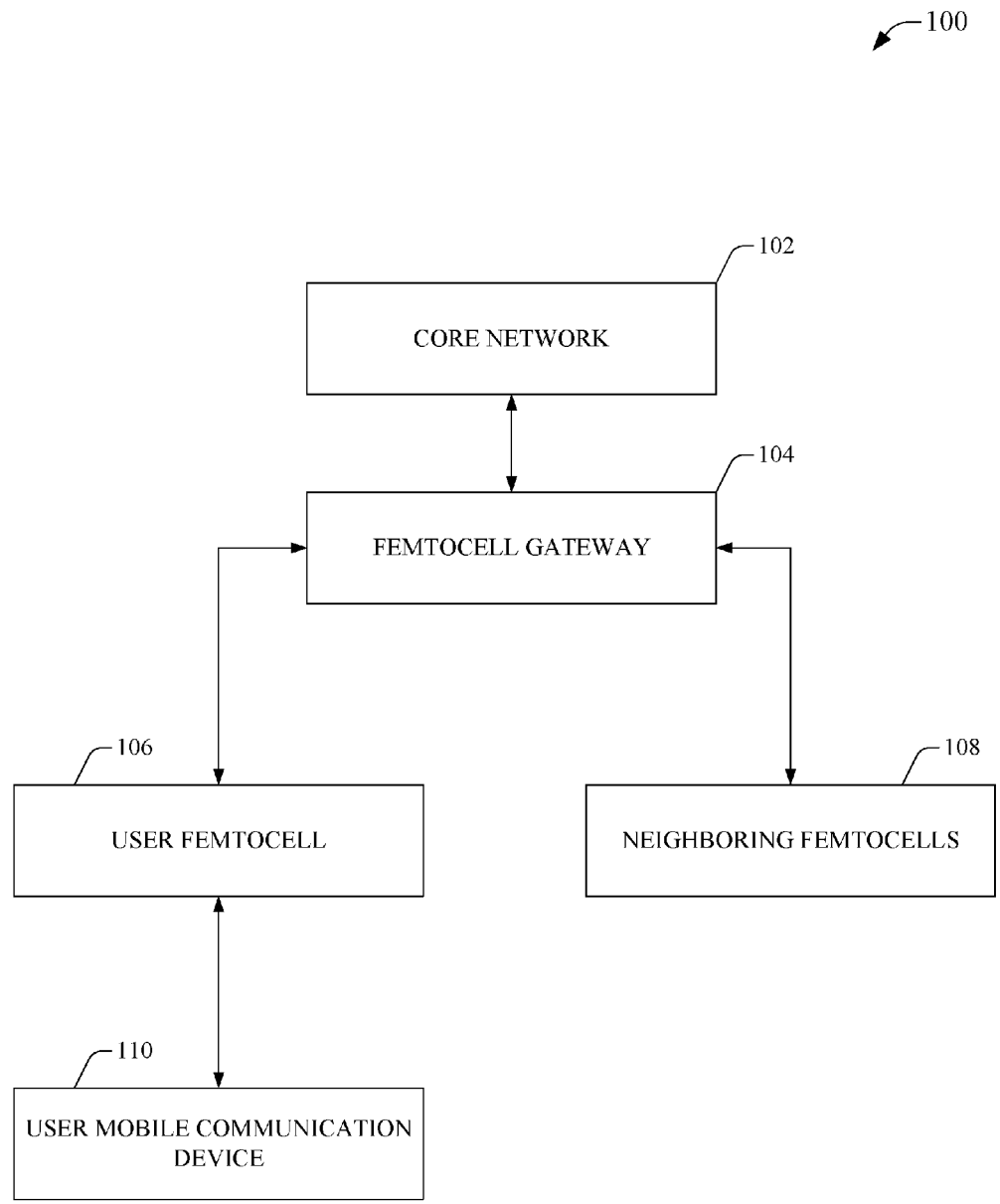
FIG. 1 illustrates an embodiment of a mobile communication network with the user's mobile communication device interacting with the user's femto cell.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Further, terms like "user equipment," "mobile station," "mobile," subscriber station," "access terminal," "terminal," "handset," "machine", and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings.

Likewise, the terms "access point," "base station," "Node B," "evolved Node B," "home Node B (HNB)," and the like, are utilized interchangeably in the subject application, and refer to a wireless network component that serves and receives data, control, voice, video, sound, gaming, or substantially any data-stream or signaling-stream from a set of subscriber stations. Data and signaling streams can be packetized or frame-based flows.

Moreover, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit. Likewise, the terms "femto cell access point" and "femto access point", "FAP", "femto AP" are utilized interchangeably.

Systems and methods disclosed herein describe initializing a femto cell for communication on a wireless network, including provisioning the user's identity into neighboring femto cells for temporary backup communications. Further, the detection of the failure of the user's femto cell is described in addition to the automatic reselection of a neighboring femto cell.

Referring initially to FIG. 1, illustrated is a wireless communication network 100. The wireless communication network 100 comprises a core network 102, a femto cell gateway 104, the user's femto cell 106, the neighboring femto cells 108 and the user's mobile communication device. It should be noted that the illustration Illustrates those portions of the wireless communication network necessary to describe the subject innovation. Further, it should be noted that the user's femto cell is not necessarily different or distinct from the neighboring femto cells and is depicted differently to illustrate the transition from a failed femto cell to a neighboring femto cell.

The core network 102 provides access to the connectivity allowing the mobile communication device to interact with other mobile communication devices or for that matter any other communication device accessible on the communications network. In another aspect, the core network 102 can perform tasks associated with the subject innovation regarding identifying neighboring femto cells, provisioning the user's identity into the neighboring femto cells, detecting the failure of the user's primary femto cell and reselecting either a secondary femto cell when the primary femto cell fails or the primary femto cell when the primary femto cell returns to service.

The femto cell gateway 104 can provide similar services as described above for the core network comprising identifying neighboring femto cells, provisioning the user's identity into the neighboring femto cells, detecting the failure of the user's primary femto cell and reselecting either a secondary femto cell when the primary femto cell fails or the primary femto cell when the primary femto cell returns to service.

The user femto cell 106 provides the user reliable wireless communications service from locations such as the user's apartment in the center of a large multi-unit apartment complex or a remote location on the fringe of a wireless communication network. The user's femto cell can also serve as a backup communications access point for the user's neighbors just as the user's neighbors femto cells provide a backup access point for the user's wireless communication access.

The neighboring femto cells 108 provide the same capabilities as described for the user femto cell 106 with the exception that for each femto cell, a different group of users are defined as the primary users. It should be noted that the primary user of any given femto cell can configure the femto cell to support reselection or to deny reselection should a neighboring user request access.

The user mobile communication device 110 provides the ability to identify prospective backup femto cells and to initiate the automatic transfer from the failed femto cell to the backup femto cell once failure of the primary femto cell occurs. In a similar fashion, the user mobile communication device 110 provides support for automatically disconnecting from the neighboring femto cell and establishing a connection with the primary femto cell once the user has repaired or replaced the primary femto cell.

Figure 2:
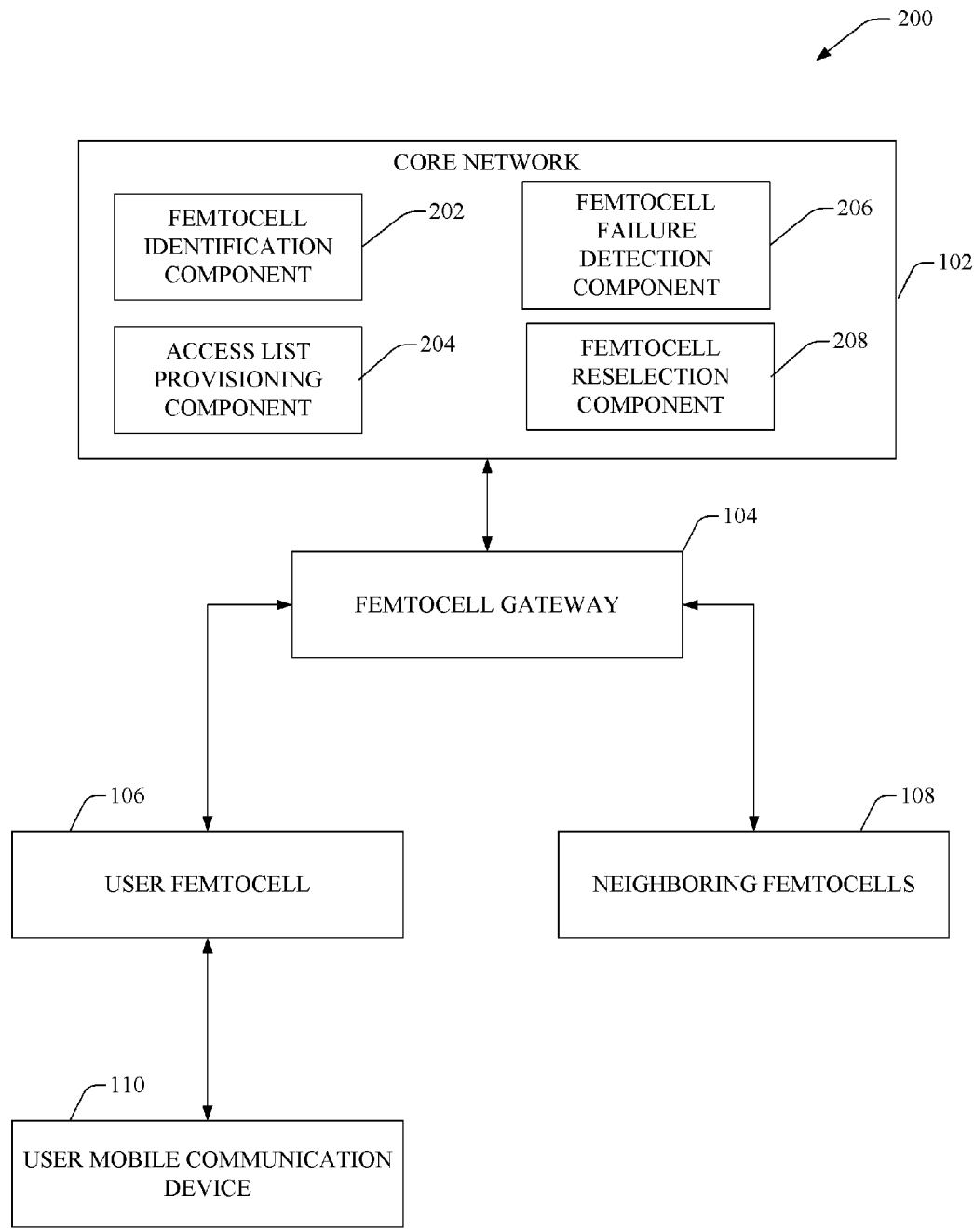
FIG. 2 illustrates an embodiment of a mobile communication network with the user's mobile communication device interacting with the user's femto cell including the core networks support of a femto cell reselection should the user's femto cell fail.

FIG. 2 depicts the core network 102 of a wireless network including the femto cell identification component 202, the access list provisioning component 204, the femto cell failure detection component 206 and the femto cell reselection component 208. The femto cell identification component 202 provides the ability to discover and identify other femto cells in the proximity of the user's femto cell that could act as a backup femto cell access point should the user's femto cell fail. The femto cell identification component 202 can determine the location of other local femto cells based on information provided to the core network during the provisioning of the other femto cells.

For example, a part of provisioning a femto cell on the communication network can include providing the street address of the location housing the femto cell. In a multi-apartment complex example, the femto cell identification component 202 can recognize the proximity of a plurality of femto cells located in the same building and either in adjacent or on the same floor as the failed femto cell.

The access list provisioning component 204 provides the ability to inform neighboring femto cells of the existence of users who might subsequently require temporary access to the neighboring femto cell and request permission to provision the user on the neighboring femto cell so future access can be automatically accomplished should the user's femto cell fail. It should be noted that neighboring femto cells can require permission before provisioning can occur.

In another aspect, permission to provide temporary communications access can be granted as a concession for adding the femto cell to the wireless communication network. In another aspect, the identity of the user temporarily accessing the femto cell or the location of the backup femto cell can be known to the core network 102 but not disclosed to the user or the neighboring femto cells. Further, the neighboring femto cells can provide constraints such as a time limit on the use of the neighboring femto cell or limits on the amount of bandwidth available while temporarily connected to the neighboring femto cell. The time limit provides communications capability if a femto cell fails but encourages the user to resolve the problem quickly. The bandwidth restriction also provides communications capability if a femto cell fails but does not adversely impact the local users of the neighboring femto cell.

The femto cell failure detection component 206 provides the ability to detect that a femto cell has failed. The femto cell failure detection component 206 can witness the disappearance of the femto cell from the core network mapping and take a proactive stance on preserving communications for the mobile device. For example, the femto cell failure detection component 206 can send a message to the mobile communication device of the failure and provide a list of possible temporary femto cell access points for consideration. In another aspect, the femto cell failure detection component 206 can notify prospective neighboring femto cells of the failure and advise the femto cells to prepare for the addition of the user as a temporary member of the femto cells access list.

The femto cell reselection component 208 can provide additional information related to selecting the best femto cell to choose for establishing temporary communications. For example, the femto cell reselection component 208 can provide information relating to the time period of support or maximum bandwidth requirements allowing the user to select a neighboring femto cell appropriate to the user's circumstances.

Figure 3:
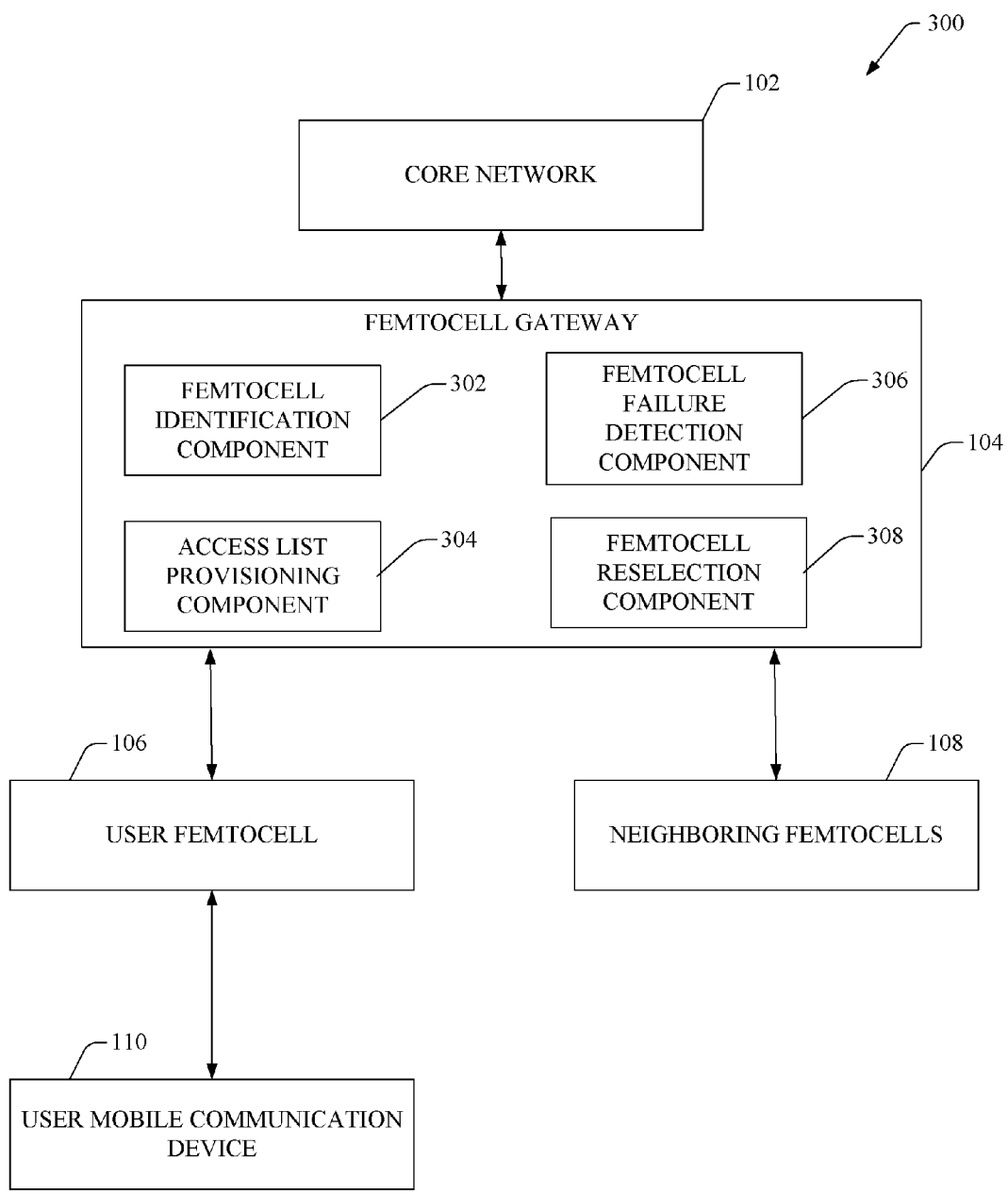
FIG. 3 illustrates an embodiment of a mobile communication network with the user's mobile communication device interacting with the user's femto cell including the femto cell gateway support of a femto cell reselection should the user's femto cell fail.

FIG. 3 depicts the femto cell gateway 104 of a wireless communications network and comprises a femto cell identification component 302, an access list provisioning component 304, a femto cell failure detection component 306 and a femto cell reselection component 308. The components and functions of the femto cell gateway 104 are similar to the components and functions of the core network with the difference being the perspective of greater information detail relating to the neighboring femto cells. The additional information relates to femto cells already approved for temporary communications and restrictions implemented on the femto cells based on hardware requirements or user configurations. For example, an older femto cell can provide less bandwidth because of slower processing capabilities. In another example, the local user of the femto cell can set a twenty-four hour limit for temporary communications requiring the temporary user to replace the failed femto cell immediately or shift to another neighboring femto cell if one is available.

Figure 4:
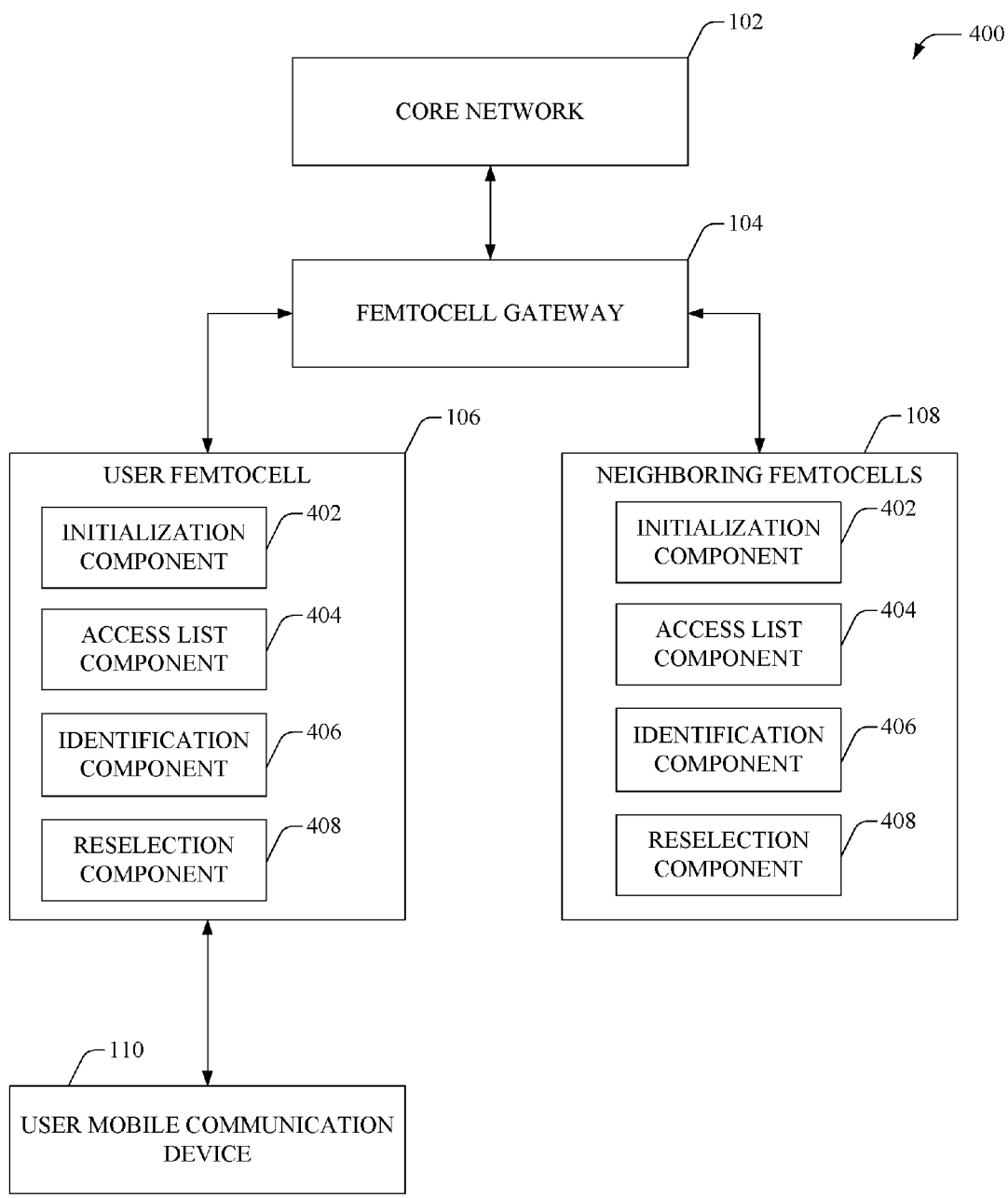
FIG. 4 illustrates an embodiment of a mobile communication network with the user's mobile communication device interacting with the user's femto cell including the user's femto cell and the neighboring femto cells support of a femto cell reselection should the user's femto cell fail.

FIG. 4 depicts the user's femto cell and the neighboring femto cells, comprising an initialization component 402, an access list component 404, an identification component 406 and a reselection component 408. The initialization component 402 provisions the user's identity into the femto cell and then adds the user's identity to the access list for the femto cell. Additional constraints, such as bandwidth limitations or communication times can also be included in the user's configuration if required.

The access list component 404 provides the ability to maintain a list of validated users granted access to the femto cell. The list is configured by the femto cell manager and can be modified as required. In another aspect, the access list component provides for provisioning neighboring users into a list representing those individuals who may subsequently require use of a neighboring femto cell. In one aspect, a core network coordinating entity such as the femto cell gateway 104 can provide the users making up this list. The core network coordinating entity by either proprietary or standardized signaling between the core networking coordinating entity and the subject femto cell can provide this information.

In another aspect, the information related to potential temporary femto cell users can be communicated between the involved users as a brokered communication from a core network entity or through direct communication between the affected users by email, SMS or even a voice call. As previously described, agreement can be required concerning restricted communication access and the identity of the femto cell or the temporary user.

The identification component 406 provides the ability for a femto cell to discover all its neighboring femto cells. Neighboring femto cells are indentified by radio signal detection, location information or user provided information. The radio signal detection can be accomplished by signal measurements from the user's communication device or by signal measurements from the neighboring femto cells. The location information can be based on location information known by the core network 102 or the femto cell gateway 104 during the provisioning process or based on GPS information. The user provided information is entered by the user and relates to information identifying the location of known femto cells.

The reselection component 408 provides the ability to receive requests from a mobile communication device 110 to add the user's identity to the access list for the femto cell. This transaction can be configured to complete automatically or to require an interaction between the requesting mobile communication device 110 and the neighboring femto cell 108.

Figure 5:
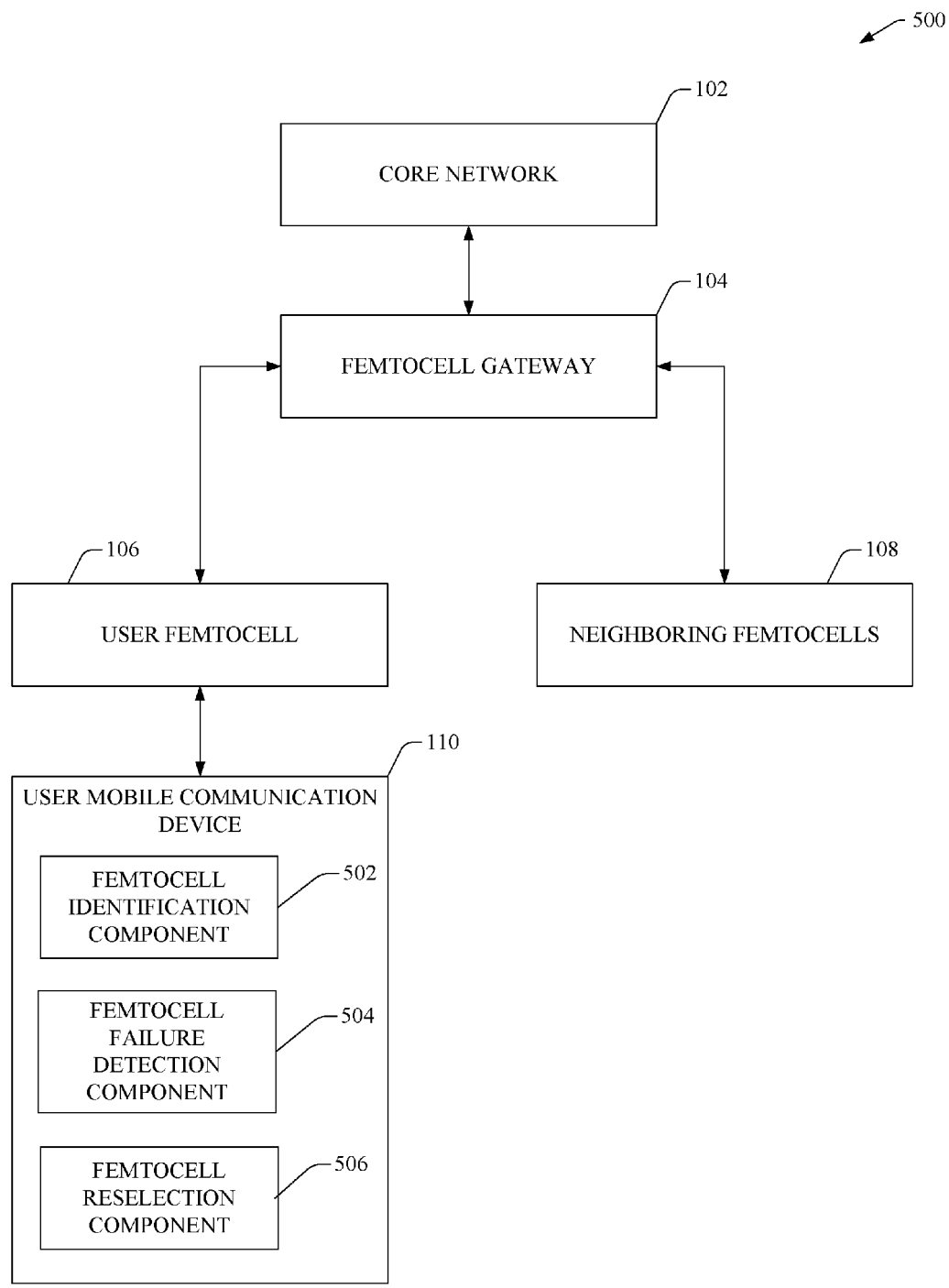
FIG. 5 illustrates an embodiment of a mobile communication network with the user's mobile communication device interacting with the user's femto cell including the user's mobile communication device support of a femto cell reselection should the user's femto cell fail.

FIG. 5 depicts the user's mobile communication device comprising the femto cell identification component 502, the femto cell failure detection component 504 and the femto cell reselection component 506. The femto cell identification component 502 can use the same information and techniques as described above for the identification component 406. This comprises radio signal detection, location information and user supplied information.

The femto cell failure detection component 504 can detect the loss of communications between the user's primary femto cell and the core network, within the femto cell or between the femto cell and the user's mobile communication device. Upon detecting the failure, the femto cell failure detection component 504 initiates the femto cell reselection mechanism.

The femto cell reselection component 506 can perform an analysis and reselection of a secondary femto cell based on the circumstances surrounding the detected failure and the information concerning secondary femto cells provided by other components of the system. In some circumstances, the femto cell reselection component 506 can determine that a better communications link is established if the user's mobile communication device connects to a macro cell rather than a neighboring femto cell.

In another aspect of the subject innovation, the femto cell reselection is performed automatically without intervention from the user and the user is notified of the failure of the primary femto cell. For example, the user's cell phone display can present a status message indicating the failure of the primary femto cell and the reselection of a neighboring femto cell for temporary communication services. The status message can also advise the user if any restrictions are applied based on requirements of the neighboring femto cell. In another aspect, the status information can be sent from the core network by SMS or email. Further, the notification can be by other service provider initiated communication such as a voice telephone call.

Further, the temporary communication service provided by the neighboring femto cell can be ended by removing the user's identity from the neighboring femto cell's access list. The user's identity can be withdrawn because the user's primary femto cell service is restored or the service provider, the owner of the neighboring femto cell or the user, withdraws the neighboring femto cell service. In another aspect, the service provider or the owner of the neighboring femto cell can limit the length of time the user is allowed service by the neighboring femto cell. If the time allowed for temporary communication is approaching termination, the user can be notified with timely warnings of service termination. If desired, the user can request an extension of time of the temporary service or if configured as such, the temporary service time can be automatically extended until the user's primary femto cell is operational.

Figure 6:
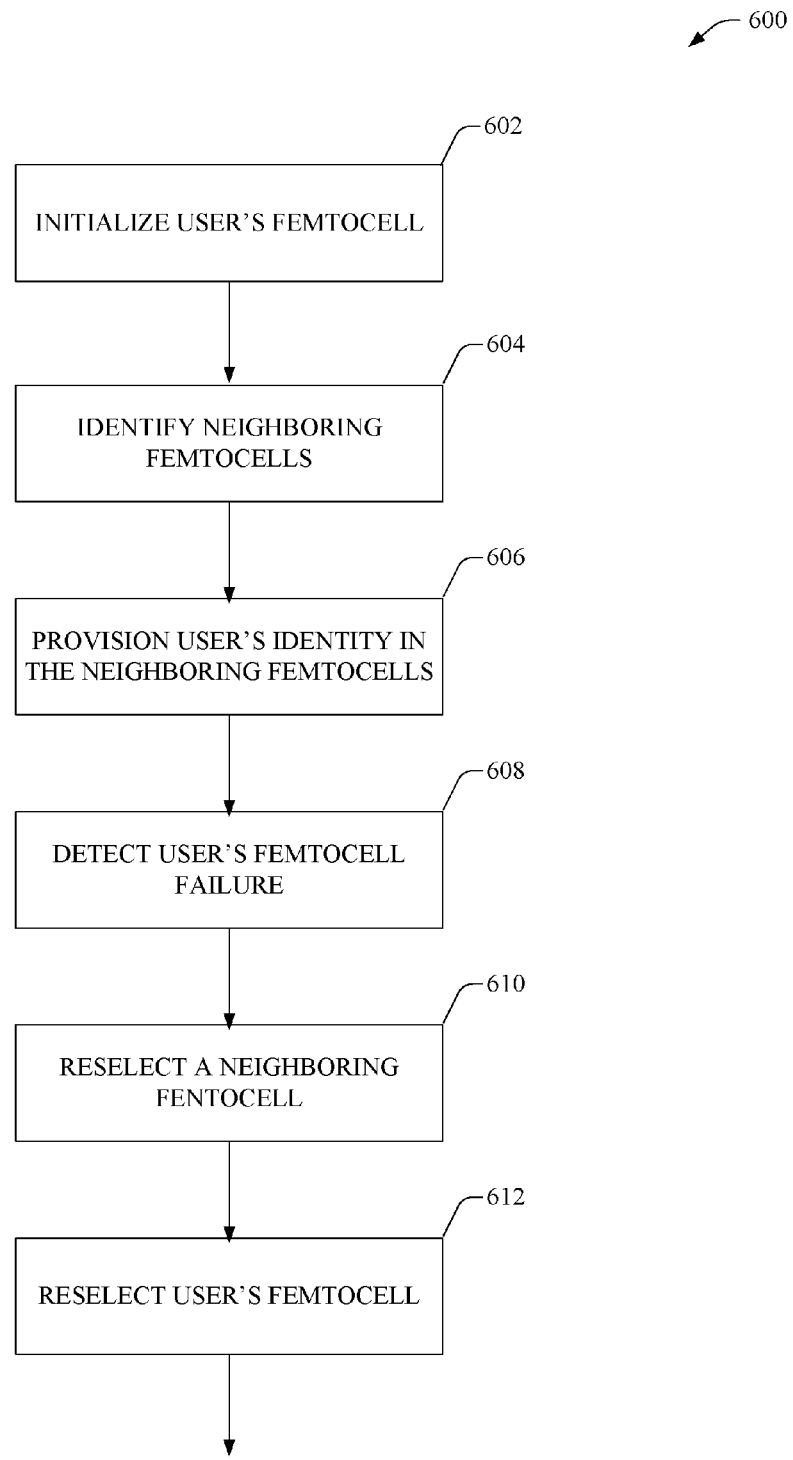
FIG. 6 illustrates an example method of a user's mobile communication device detecting the primary femto cell failure and reselecting a neighboring femto cell for temporary communications support.

Looking to FIG. 6, illustrated is a method of detecting a failed primary femtocell and automatically reselecting a secondary femto cell. Beginning at step 602, the user's femto cell is initialized. The user's identity is added to the femto cell's access list providing access for the user's mobile communication device to the wireless network. Next, at step 604, neighboring femto cells are identified by one or more means including radio signal detection, location information or user provided information.

Next, at step 606 the method provisions the user's identity into the identified neighboring femto cells. The provisioning can occur by a core network coordinating entity or communication between the involved users. Next at step 608, the method detects a failure of the user's femto cell. The failure can occur between the femto cell and the core network, internal to the femto cell or between the femto cell and the mobile communication device.

Next, at step 610, a reselection is initiated to establish communications with a neighboring femto cell. The selected femto cell is based on permissions granted by the neighboring femto cell and the proximity of the neighboring femto cell. Next at step 612, another reselection occurs when the user's femto cell returns to operation. During this step, the user's name is removed from the access list of the neighboring femto cell and added to the access list of the user's primary femto cell.

Figure 7:
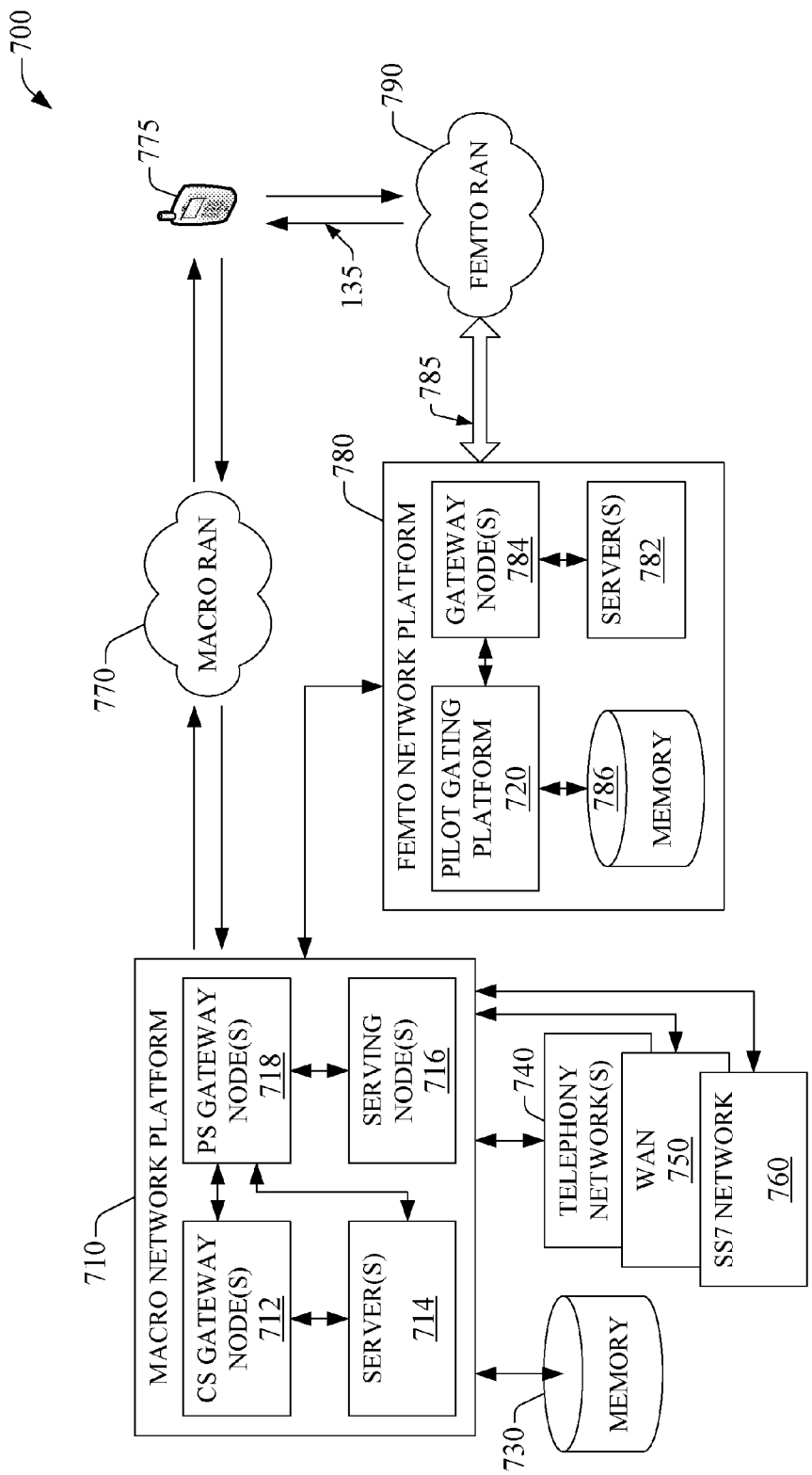
FIG. 7 illustrates an example wireless communication environment with associated components for operation of a femto cell in accordance with the subject specification.

Looking next to FIG. 7, an example wireless communication environment 700, with associated components for operation of a femto cell is illustrated in accordance with aspects described herein. Wireless communication environment 700 includes two wireless network platforms: (i) A macro network platform 710 that serves, or facilitates communication) with user equipment 775 via a macro radio access network (RAN) 770. It should be appreciated that in cellular wireless technologies (e.g., 4G, 3GPP UMTS, HSPA, 3GPP LTE, 3GPP UMB), macro network platform 710 is embodied in a Core Network. (ii) A femto network platform 780, which can provide communication with UE 775 through a femto RAN 790, linked to the femto network platform 780 via backhaul pipe(s) 785, wherein backhaul pipe(s) are substantially the same a backhaul link 140. It should be appreciated that femto network platform 780 typically offloads UE 775 from macro network, once UE 775 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 770 can comprise various coverage cells like cell 105, while femto RAN 790 can comprise multiple femto access points. As mentioned above, it is to be appreciated that deployment density in femto RAN 790 is substantially higher than in macro RAN 770.

Generally, both macro and femto network platforms 710 and 780 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 710 includes CS gateway node(s) 712 which can interface CS traffic received from legacy networks like telephony network(s) 740 (e.g., public switched telephone network (PSTN), or public land mobile network (PLMN)) or a SS7 network 760. Circuit switched gateway 712 can authorize and authenticate traffic (e.g., voice) arising from such networks. Additionally, CS gateway 712 can access mobility, or roaming, data generated through SS7 network 760; for instance, mobility data stored in a VLR, which can reside in memory 730. Moreover, CS gateway node(s) 712 interfaces CS-based traffic and signaling and gateway node(s) 718. As an example, in a 3GPP UMTS network, gateway node(s) 718 can be embodied in gateway GPRS support node(s) (GGSN).

In addition to receiving and processing CS-switched traffic and signaling, gateway node(s) 718 can authorize and authenticate PS-based data sessions with served (e.g., through macro RAN) wireless devices. Data sessions can include traffic exchange with networks external to the macro network platform 710, like wide area network(s) (WANs) 750; it should be appreciated that local area network(s) (LANs) can also be interfaced with macro network platform 710 through gateway node(s) 718. Gateway node(s) 718 generates packet data contexts when a data session is established. To that end, in an aspect, gateway node(s) 718 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 714. It is to be noted that in 3GPP UMTS network(s), gateway node(s) 718 (e.g., GGSN) and tunnel interface (e.g., TTG) comprise a packet data gateway (PDG).

Macro network platform 710 also includes serving node(s) 716 that convey the various packetized flows of information or data streams, received through gateway node(s) 718. As an example, in a 3GPP UMTS network, serving node(s) can be embodied in serving GPRS support node(s) (SGSN).

As indicated above, server(s) 714 in macro network platform 710 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 710. Data streams can be conveyed to gateway node(s) 718 for authorization/authentication and initiation of a data session, and to serving node(s) 716 for communication thereafter. Server(s) 714 can also effect security (e.g., implement one or more firewalls) of macro network platform 710 to ensure network's operation and data integrity in addition to authorization and authentication procedures that CS gateway node(s) 712 and gateway node(s) 718 can enact. Moreover, server(s) 714 can provision services from external network(s), e.g., WAN 750, or Global Positioning System (GPS) network(s) (not shown). It is to be noted that server(s) 714 can include one or more processor configured to confer at least in part the functionality of macro network platform 710. To that end, the one or more processor can execute code instructions stored in memory 730, for example.

In example wireless environment 700, memory 730 stores information related to operation of macro network platform 710. Information can include business data associated with subscribers; market plans and strategies, e.g., promotional campaigns, business partnerships; operational data for mobile devices served through macro network platform; service and privacy policies; end-user service logs for law enforcement; and so forth. Memory 730 can also store information from at least one of telephony network(s) 740, WAN(s) 750, or SS7 network 760.

Femto gateway node(s) 784 have substantially the same functionality as PS gateway node(s) 718. Additionally, femto gateway node(s) 784 can also include substantially all functionality of serving node(s) 716. In an aspect, femto gateway node(s) 784 facilitates handover resolution, e.g., assessment and execution.

Server(s) 782 have substantially the same functionality as described in connection with server(s) 714. In an aspect, server(s) 782 can execute multiple application(s) that provide service (e.g., voice and data) to wireless devices served through femto RAN 790. Server(s) 782 can also provide security features to femto network platform. In addition, server(s) 782 can manage (e.g., schedule, queue, format . . . ) substantially all packetized flows (e.g., IP-based, frame relay-based, ATM-based) it generates in addition to data received from macro network platform 710. It is to be noted that server(s) 782 can include one or more processor configured to confer at least in part the functionality of macro network platform 710. To that end, the one or more processor can execute code instructions stored in memory 786, for example.

Memory 786 can include information relevant to operation of the various components of femto network platform 780. For example operational information that can be stored in memory 786 can comprise, but is not limited to, subscriber information; contracted services; maintenance and service records; femto cell configuration (e.g., devices served through femto RAN 790; access control lists, or white lists); service policies and specifications; privacy policies; add-on features; and so forth.

Figure 8:
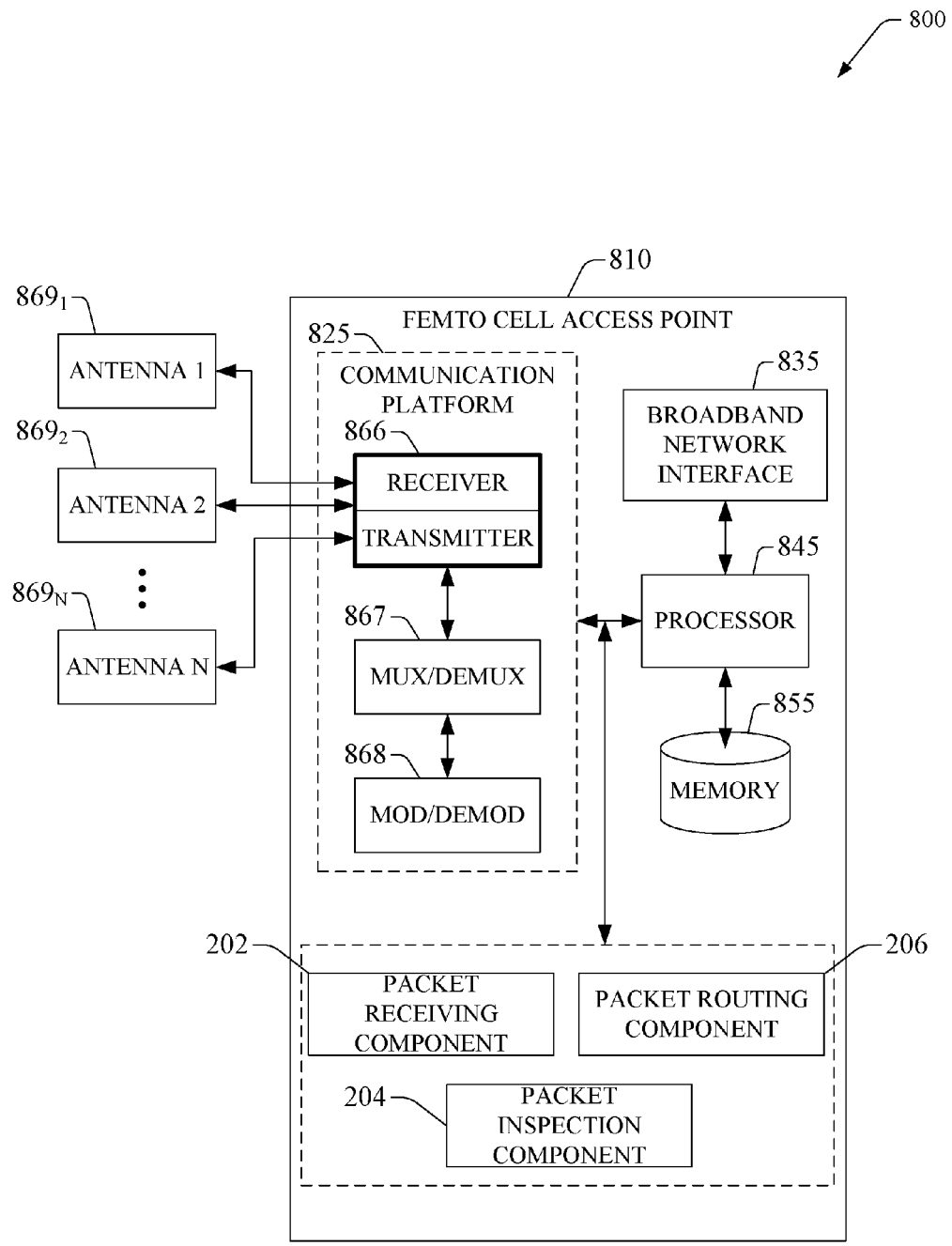
FIG. 8 illustrates an example embodiment of a femto cell access point that can facilitate detecting a femto cell failure and reselecting a neighboring femto cell.

Turning now to FIG. 8, an example embodiment 800 of a femto access point that can facilitate femto cell reselection in accordance with aspects described herein is illustrated. Femto cell AP 810 can receive and transmit signal(s) (e.g., traffic and control signals) from and to wireless devices, access terminals, wireless ports and routers, etc., through a set of antennas $869_1$-$869_N$. It should be appreciated that while antennas $869_1$-$869_N$ are a part of communication platform 825, which comprises electronic components and associated circuitry that provides for processing and manipulating of received signal(s) (e.g., a packet flow) and signal(s) (e.g., a broadcast control channel) to be transmitted. In an aspect, communication platform 825 includes a transmitter/receiver (e.g., a transceiver) 866 that can convert signal(s) from analog format to digital format upon reception, and from digital format to analog format upon transmission.

Additionally, receiver/transmitter 866 can divide a single data stream into multiple, parallel data streams, or perform the reciprocal operation. Coupled to transceiver 866 is a multiplexer/demultiplexer 867 that facilitates manipulation of signal in time and frequency space. Electronic component 867 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 867 can scramble and spread information (e.g., codes) according to substantially any code known in the art; e.g., Hadamard-Walsh codes, Baker codes, Kasami codes, polyphase codes, and so on. A modulator/demodulator 868 is also a part of operational group 825, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 810 also includes a processor 845 configured to confer functionality, at least partially, to substantially any electronic component in the femto access point 810, in accordance with aspects of the subject innovation. In particular, processor 845 can facilitate femto AP 810 to implement configuration instructions received through communication platform 825, which can include storing data in memory 855. In addition, processor 845 facilitates femto AP 810 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 845 can manipulate antennas $869_1$-$869_N$ to facilitate beamforming or selective radiation pattern formation, which can benefit specific locations (e.g., basement, home office . . . ), covered by femto AP; and exploit substantially any other advantages associated with smart-antenna technology. Memory 855 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 855 can store configuration information such as schedules and policies; femto AP address(es) or geographical indicator(s); access lists (e.g., white lists); license(s) for utilization of add-features for femto AP 810, and so forth.

In embodiment 800, processor 845 is coupled to the memory 855 in order to store and retrieve information necessary to operate and/or confer functionality to communication platform 825, broadband network interface 835 (e.g., a broadband modem), and other operational components (e.g., multimode chipset(s), power supply sources . . . ; not shown) that support femto access point 810. Further, it can be appreciated that the packet receiving component 202, packet inspection component 204 and packet routing component 206, can include functionality, as more fully described herein, for example, with regard to systems 200 and 300.

Figure 9:
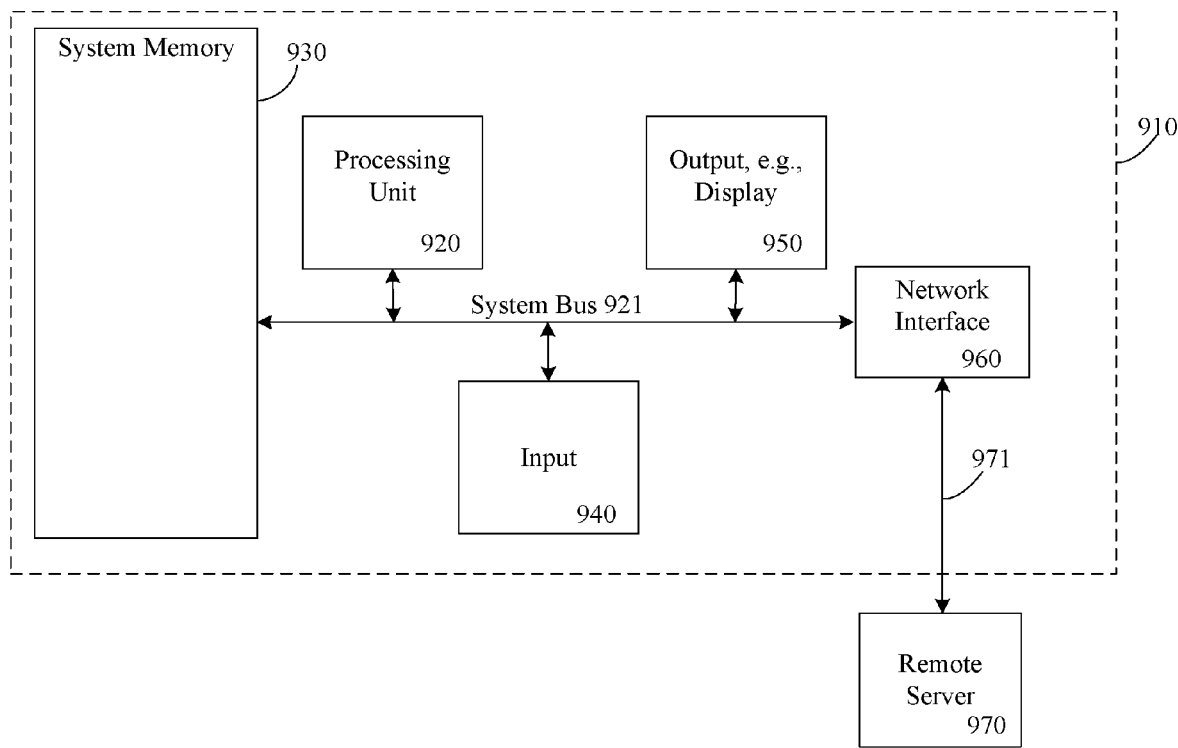
FIG. 9 illustrates a block diagram of an exemplary, non-limiting operating environment in which various aspects described herein can function.

FIG. 9 illustrates an example of a suitable computing system environment 900 implementing the claimed subject matter. Although as made clear above, the computing system environment 900 is only one example of a suitable computing environment for a mobile device and is not intended to suggest any limitation as to the scope of use or functionality of the claimed subject matter. Further, the computing environment 900 is not intended to suggest any dependency or requirement relating to the claimed subject matter and any one or combination of components illustrated in the example operating environment 900.

With reference to FIG. 9, an example of a remote device for implementing various aspects described herein includes a general purpose computing device in the form of a computer 910. Components of computer 910 can include, but are not limited to, a processing unit 920, a system memory 930, and a system bus 921 that couples various system components including the system memory to the processing unit 920. The system bus 921 can be any of several types of bus structures including a memory bus or memory controller, a peripheral bus, and a local bus using any of a variety of bus architectures.

Computer 910 can include a variety of computer readable media. Computer readable media can be any available media accessible by computer 910. By way of example, and not limitation, computer readable media can comprise computer storage media. Computer storage media includes volatile and nonvolatile as well as removable and non-removable media implemented in any method or technology for storage of information such as computer readable instructions, data structures, program modules or other data.

Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium suitable to store the desired information and which can be accessed by computer 910.

Communication media can embody computer readable instructions, data structures, program modules or other data in a modulated data signal such as a carrier wave or other transport mechanism and can include any suitable information delivery media.

The system memory 930 can include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, can be stored in memory 930. Memory 930 can also contain data and/or program modules that are immediately accessible to and/or presently being operated on by processing unit 920. By way of non-limiting example, memory 930 can also include an operating system, application programs, other program modules, and program data.

The computer 910 can also include other removable/non-removable, volatile/nonvolatile computer storage media. For example, computer 910 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 921 through a non-removable memory interface such as an interface, and a magnetic disk drive or optical disk drive can be connected to the system bus 921 by a removable memory interface, such as an interface.

A user can enter commands and information into the computer 910 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 920 through user input 1040 and associated interface(s) that are coupled to the system bus 921, but can be connected by other interface and bus structures, such as a parallel port, game port or a universal serial bus (USB). A graphics subsystem can also be connected to the system bus 921. In addition, a monitor or other type of display device can be connected to the system bus 921 via an interface, such as output interface 950, which can in turn communicate with video memory. In addition to a monitor, computers can also include other peripheral output devices, such as speakers and/or a printer, which can also be connected through output interface 950.

The computer 910 can operate in a networked or distributed environment using logical connections to one or more other remote computers, such as remote server 970, which can in turn have media capabilities different from device 910. The remote server 970 can be a personal computer, a server, a router, a network PC, a peer device or other common network node, and/or any other remote media consumption or transmission device, and can include any or all of the elements described above relative to the computer 910. The logical connections depicted in FIG. 10 include a network 971, such local area network (LAN) or a wide area network (WAN), but can also include other networks/buses. Such networking environments are commonplace in homes, offices, enterprise-wide computer networks, intranets and the Internet.

When used in a LAN networking environment, the computer 910 connects to the LAN 1071 through a network interface or adapter. When used in a WAN networking environment, the computer 910 can include a communications component, such as a modem, or other means for establishing communications over the WAN, such as the Internet. A communications component, such as a modem, which can be internal or external, connects to the system bus 921 via the user input interface at input 940 and/or other appropriate mechanism. In a networked environment, program modules depicted relative to the computer 910, or portions thereof, can be stored in a remote memory storage device. It should be appreciated that the network connections shown and described are exemplary and other means of establishing a communications link between the computers can be used.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and that any one or more middle layers, such as a management layer, can be provided to communicatively couple to such sub-components in order to provide integrated functionality. Any components described herein may also interact with one or more other components not specifically described herein but generally known by those of skill in the art.

In view of the exemplary systems described supra, methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks are required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

What is claimed is:

1. A system, comprising:
    a tangible memory storing computer-executable instructions; and
    a processor, communicatively coupled to the tangible memory, that facilitates execution of the computer-executable instructions to at least:
        initiate a first provisioning of a user identity into a set of primary user identities associated with a primary femto cell;
        identify a neighboring femto cell that meets a pre-defined condition of proximity with respect to the primary femto cell;
        initiate a second provisioning of the user identity into an access set of user identities associated with the neighboring femto cell, wherein the access set includes user identities that are permitted to request a temporary communication service from the neighboring femto cell, wherein the neighboring femto cell has an associated set of primary user identities and the user identity is not provisioned in the set of primary user identities associated with the neighboring femto cell;
        detect a failure of the primary femto cell to provide a communication service to a device associated with the user identity;
        in response to the detected failure of the primary femto cell, initiate the temporary communication service to be provided by the neighboring femto cell to the device associated with the user; and
    reestablish communication services to the device associated with the user identity with the primary femto cell in response to resolution of the detected failure of the primary femto cell.

2. The system of claim 1, wherein the processor further facilitates the execution of the computer-executable instructions to identify the neighboring femto cell based on a radio signal detection.

3. The system of claim 2, wherein the radio signal detection is based on signal measurements from a mobile communication device.

4. The system of claim 1, wherein the processor further facilitates the execution of the computer-executable instructions to identify the neighboring femto cell based on information received from a network.

5. The system of claim 4, wherein the information received from the network comprises provisioning information associated with the neighboring femto cell and location information received from the neighboring femto cell.

6. The system of claim 1, wherein the processor further facilitates the execution of the computer-executable instructions to identify the neighboring femto cell based on user-provided information.

7. The system of claim 1, wherein the processor further facilitates the execution of the computer-executable instructions to impose a time limitation on the temporary communication service through the neighboring femto cell.

8. The system of claim 1, wherein the processor further facilitates the execution of the computer-executable instructions to initiate the second provisioning of the user identity into the access set of user identities associated with the neighboring femto cell based on a network coordinating entity.

9. The system of claim 8, wherein the processor further facilitates the execution of the computer-executable instructions to enable the network coordinating entity to communicate with the neighboring femto cell based on a predetermined communications protocol.

10. The system of claim 8, wherein the processor further facilitates the execution of the computer-executable instructions to enable another user identity in the set of primary user identities on the neighboring femto cell to deny temporary communication services to the device associated with the user identity in the access set.

11. The system of claim 1, wherein the processor further facilitates the execution of the computer-executable instructions to initiate the second provisioning of the user identity based on communication between the device associated with the failure of the primary femto cell and another device associated with an owner user identity of the neighboring femto cell.

12. The system of claim 11, wherein the communication comprises a brokered communication received from a network entity.

13. The system of claim 11, wherein the communication comprises an email.

14. The system of claim 1, wherein the processor further facilitates the execution of the computer-executable instructions to receive permission from an owner user identity of the neighboring femto cell before initiating the second provisioning of the user identity.

15. The system of claim 1, wherein the processor further facilitates the execution of the computer-executable instructions to mask the user identity.

16. The system of claim 1, wherein the processor further facilitates the execution of the computer-executable instructions to impose a bandwidth limitation on the temporary communication services through the neighboring femto cell.

17. The system of claim 7, wherein the processor further facilitates the execution of the computer-executable instructions to facilitate a request for an extension of the time limitation from neighboring femto cell.

18. The system of claim 1, wherein the processor further facilitates the execution of the computer-executable instructions to report that the primary femto cell has failed.

19. The system of claim 1, wherein the processor further facilitates the execution of the computer-executable instructions to reselect the primary femto cell in response to return of the primary femto cell from failure to active service.

20. A method, comprising:
initiating, by a system including a processor, a first provisioning of a user identity into a set of primary user identities associated with a primary femto cell;
identifying, by the system, a neighboring femto cell that meets a pre-defined condition of proximity with respect to the primary femto cell;
initiating, by the system, second provisioning of the user identity into an access set of user identities associated with the neighboring femto cell, wherein the access set includes user identities that are permitted to request temporary communication services from the neighboring femto cell, wherein the neighboring femto cell has an associated set of primary user identities and the user identity is not provisioned in the set of primary user identities associated with the neighboring femto cell;
detecting, by the system, a failure of the primary femto cell to provide a communication service to a device associated with the user identity;
in response to the detected failure of the primary femto cell, establishing, by the system, the temporary communication services to be provided by the neighboring femto cell to the device associated with the user identity, and
in response to resolution of the detected failure of the primary femto cell, reestablishing, by the system, the communication service from the primary femto cell to the device associated with the user identity.

21. A non-transitory computer-readable storage medium having instructions stored thereon that, in response to execution, cause at least one device to perform operations, comprising:
initiating a first provisioning of a user identity into a set of primary user identities associated with a primary femto cell;
identifying a neighboring femto cell that meets a pre-defined condition of proximity with respect to the primary femto cell;
initiating a second provisioning of the user identity into an access set of user identities associated with the neighboring femto cell, wherein the access set includes user identities that are permitted to request temporary communication services from the neighboring femto cell, wherein the neighboring femto cell has an associated set of primary user identities and the user identity is not provisioned in the set of primary user identities associated with the neighboring femto cell;
detecting a failure of the primary femto cell to provide a communication service to the device associated with the user identity;
in response to the detected failure of the primary femto cell, initiating the temporary communication services to be provided by the neighboring femto cell to the device associated with the user identity, and
in response to resolution of the detected failure of the primary femto cell, reestablishing the communication service from the primary femto cell to the device associated with the user identity.

* * * * *